United States Patent

Fukuda et al.

[11] Patent Number: 5,923,772
[45] Date of Patent: Jul. 13, 1999

[54] METHOD AND APPARATUS FOR VISUAL RECOGNITION OF A COMPONENT SUPPLIED TO AN INDUSTRIAL AUTOMATED SYSTEM

[75] Inventors: Shozo Fukuda, Osaka; Masamichi Morimoto, Moriguchi; Atsushi Tanabe, Kadoma; Shuichi Yokota, Kyoto, all of Japan

[73] Assignee: Matsushita Electric Industrial Co., Ltd., Japan

[21] Appl. No.: 08/843,054

[22] Filed: Apr. 11, 1997

[30] Foreign Application Priority Data

Apr. 16, 1996 [JP] Japan .................................. 8-093705

[51] Int. Cl.⁶ .................................................. G06K 9/00
[52] U.S. Cl. ........................................ 382/141; 382/152
[58] Field of Search ................................ 382/141, 142, 382/143, 144, 145, 153, 152; 901/47

[56] References Cited

U.S. PATENT DOCUMENTS

| | | | |
|---|---|---|---|
| 4,584,045 | 4/1986 | Richards | 382/153 |
| 4,636,135 | 1/1987 | Bancon | 382/153 |
| 4,695,701 | 9/1987 | Monteith et al. | 219/121 |
| 4,881,863 | 11/1989 | Braginsky | 414/225 |
| 4,893,183 | 1/1990 | Nayar | 382/153 |
| 4,985,846 | 1/1991 | Fallon | 382/153 |

*Primary Examiner*—Christopher S Kelley
*Assistant Examiner*—Sheela Chawan
*Attorney, Agent, or Firm*—Parkhurst & Wendel

[57] ABSTRACT

A visual recognition apparatus of the invention can acquire an image exclusive of a background of a subject of image processing, thereby rendering the image of the subject fit for the image processing. More specifically, a mirror-surfaced collar covering a retainer has a specified configuration and a specified positional relationship with a lighting element and a camera such that a light from the lighting element toward the retainer is reflected by the mirror-surfaced collar for deviation from a light path to enter the camera.

8 Claims, 4 Drawing Sheets

METHOD AND APPARATUS FOR VISUAL RECOGNITION OF A COMPONENT SUPPLIED TO AN INDUSTRIAL AUTOMATED SYSTEM

TECHNICAL FIELD

The present invention relates to a visual recognition apparatus for visually recognizing components, as a subject of recognition, which are supplied to an industrial automated system such as a packaging machine for electronic components and the like, and to a component recognition method for use in the apparatus.

BACKGROUND ART

Recently, there is an increasing tendency to utilize visual recognition apparatuses in packaging machines and the like, as an application of a sensing technology for positioning electronic components to be mounted on circuit boards through feedback control, thereby producing circuit boards of higher package density.

A conventional visual recognition apparatus will hereinbelow be described with reference to the accompanying drawing.

FIG. 4 schematically illustrates the arrangement of the conventional visual recognition apparatus. In the figure, a retainer 1 retains a subject 2 to be recognized, such as an electronic component supplied to the industrial automated system. Indicated at 3 is a lighting element and at 4 is a camera.

Now referring to FIG. 4, description will be given on the operation of the visual recognition apparatus of the above arrangement.

First, the retainer 1 takes up by sucking or gripping an electronic component, as the subject of recognition 2, from a predetermined component supply section (not shown). Subsequently, as holding the subject of recognition 2, the retainer 1 moves into a field of view of the camera 4, where the retainer 1 stands still at place until an image of the recognition subject 2 is picked up by the camera. At this time, the subject of recognition 2 is illuminated by the lighting element 3 so as to be given a sufficient brightness to be photographed by the camera 4. The camera 4, in turn, acquires the image of the recognition subject 2 in a rectangular frame, which includes the recognition subject 2 against the retainer 1 as a background. The image thus acquired is committed to an image recognition processing. A position and an attitude of the recognition subject 2 is determined based on the processed image and the results are used for positioning the recognition subject 2 on a circuit board.

In the conventional visual recognition apparatus of the above arrangement, however, the retainer 1 holding the subject of recognition 2 is also irradiated with light from the lighting element 3. Accordingly, the image acquired by the camera 4 also includes an image of the retainer 1. This causes an error in extraction of the recognition subject 2 committed to the image processing. To over come such a drawback, a black coating is usually applied to the surface of the retainer 1 for minimizing light reflection from the retainer 1. Unfortunately, the light reflection is affected by the characteristic or finishing of the coating. Therefore, it is impossible to completely eliminate the light reflection from the retainer 1. This results in the impossibility of preventing the retainer 1 from being photographed along with the recognition subject 2.

DISCLOSURE OF THE INVENTION

In view of the foregoing, it is an object of the invention is to provide a visual recognition apparatus capable of positively preventing the background of a recognition subject from being photographed along with the subject to be visually recognized, so as to offer an image which is exclusive of the background of the recognition subject and fit for the image processing.

The visual recognition apparatus of the invention is characterized by an arrangement wherein a mirror-surfaced collar has a specified configuration and a specified positional relationship with a lighting element and an imaging unit, such that a light from the lighting element toward a retainer may be reflected by the mirror-like collar for deviation from a light path to enter the imaging unit. This arrangement can positively prevent the background of the recognition subject from being photographed, the background causing an error in the image processing for recognizing the subject. Thus can be obtained the image fit for the image processing, which image is exclusive of the background of the subject.

A visual recognition apparatus in a first aspect of the invention, which visually recognizes, as a subject of recognition, a component supplied to an industrial automated system, comprises a retainer for retaining the subject to be recognized; a mirror-surfaced collar provided so as to cover the retainer; a lighting element for applying suitable light rays to the subject of recognition retained by the retainer; and an imaging unit for capturing an image of the subject of recognition retained by the retainer, the mirror-surfaced collar so positioned as to reflect a light from the lighting element toward the retainer for deviation thereof from a light path to enter the imaging unit.

A visual recognition apparatus in a second aspect of the invention is arranged such that the lighting element, the imaging unit and the mirror-surfaced collar have a specified positional relationship such that the light from the lighting element toward the retainer is reflected for deviation from the light path to enter the imaging unit.

In these arrangements, of the light rays emitted from the lighting element, the light toward the retainer is reflected by the mirror-surfaced collar covering the retainer in a direction deviated from the light path to enter the imaging unit.

A visual recognition apparatus in a third aspect of the invention, which visually recognizes, as a subject of recognition, a component supplied to an industrial automated system, comprises a retainer for retaining the subject to be visually recognized; a mirror-surfaced collar provided so as to cover the retainer; a plurality of lighting elements for applying suitable light rays to the subject of recognition retained by the retainer; and an imaging unit for capturing an image of the subject of recognition retained by the retainer, wherein the lighting elements are located, respectively, at one position to emit light rays toward the retainer so as to cause reflection thereof from the mirror-surfaced collar in a direction of a light path to enter the imaging unit and at the other position to emit a light toward the retainer so as to cause reflection thereof from the mirror-surfaced collar in a direction deviated from the light path to enter the imaging unit.

In this arrangement, the mirror-surfaced collar covering the retainer reflects the light rays from the lighting element at one position in the direction to enter the imaging unit while reflects the light from the lighting element at the other position for deviation thereof from the light path to enter the imaging unit.

EMBODIMENTS

A visual recognition apparatus according to a first embodiment of the invention will be described in detail with reference to the drawings.

Figure 1:
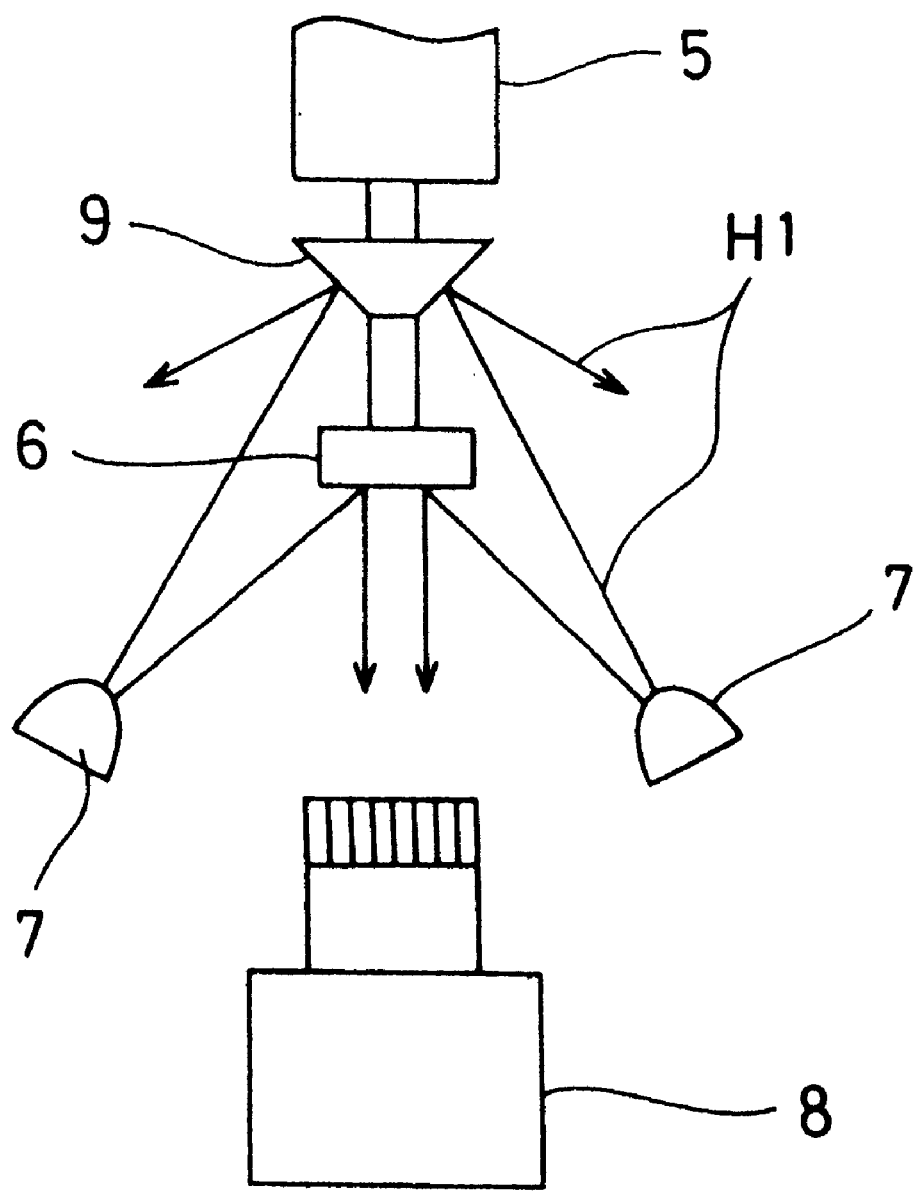
FIG. 1 is a schematic diagram illustrating the arrangement of a visual recognition apparatus according to a first embodiment of the invention.

FIG. 1 schematically illustrates the visual recognition apparatus of this embodiment. In the figure, a retainer for retaining a subject of recognition 6 is indicated at 5, a lighting element at 7, a camera as an imaging unit at 8, and a mirror-surfaced collar provided so as to cover the retainer 5 is at 9. The mirror-surfaced collar 9 has a specified configuration and a specified positional relationship with the lighting element 7 and the camera 8 such that a light H1 from the lighting element 7 toward the retainer 5 is reflected by the mirror-surfaced collar for deviation thereof from a light path to enter the camera 8.

Now referring to FIGS. 1 and 2, description will be given on the operation of the visual recognition apparatus of the above arrangement.

In FIG. 1, the subject of recognition 6 is first held by the retainer 5 in the same way as in the conventional example, and fixed at position in the field of view of the camera 8. Subsequently, the subject of recognition 6 is illuminated by the lighting element 7 to be photographed by the camera 8. The mirror-surfaced collar 9 has a positional relationship with the lighting element 7 and the camera 8 such that a light 13 from the lighting element 7 toward the retainer 5 is assuredly reflected from the surface of the mirror-surfaced collar 9 in the direction of a reflected light 14 according to the law of reflection, as shown in FIG. 2. This eliminates the existence of a light 15 incident on the camera 8. That is, an image of the retainer 5 covered by the mirror-surfaced collar 9 of FIG. 1 is not picked up by the camera 8 and hence, a background of the recognition subject 6, which may cause an error of the image processing, is eliminated from the image of the recognition subject 6.

With the visual recognition apparatus of the above embodiment wherein the mirror-surfaced collar 9 covering the retainer 5 has the specified configuration and the specified positional relationship with the lighting element 7 and the camera 8, the background of the recognition subject 6 is eliminated from the image of the recognition subject 6 thereby rendering the image fit for the image processing for recognition of the subject 6.

Next, description will be given on a visual recognition apparatus according to a second embodiment of the invention.

Figure 2:
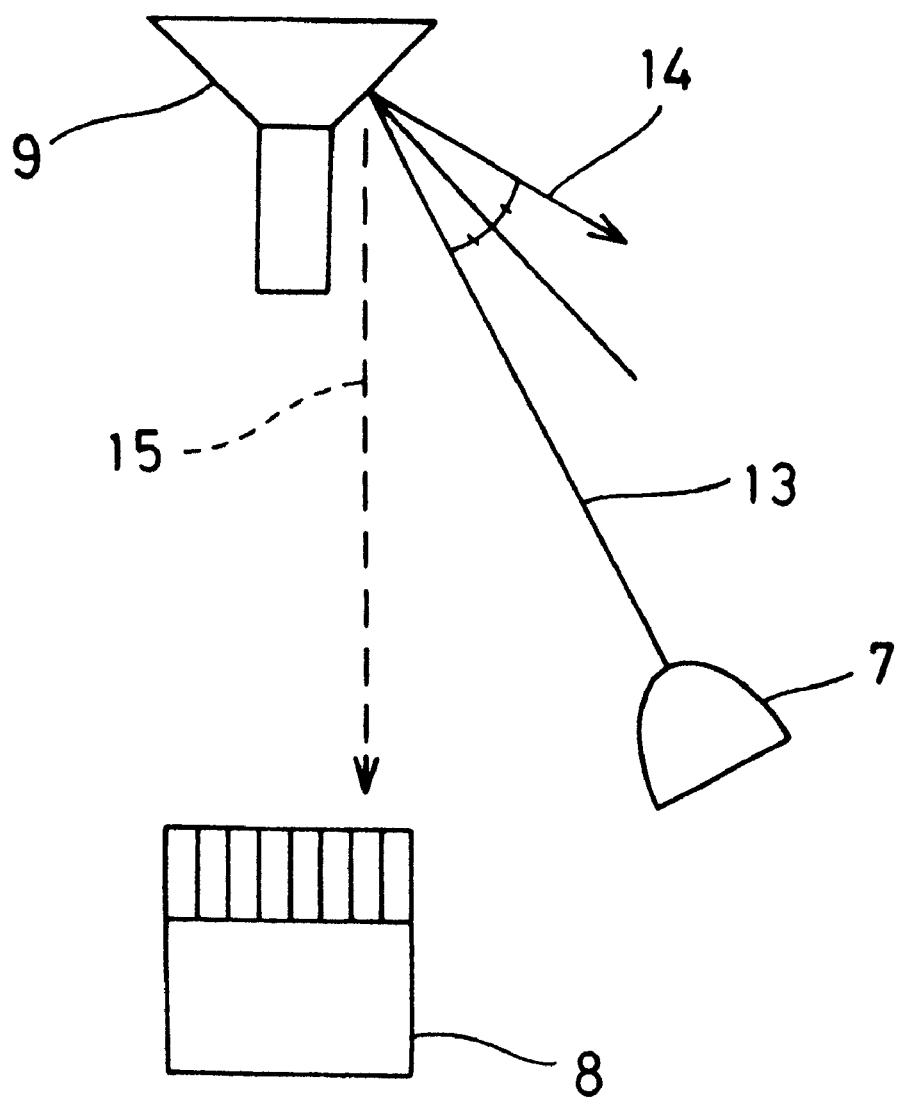
FIG. 2 diagrammatically illustrates the operation of the visual recognition apparatus of the above embodiment.
Figure 3:
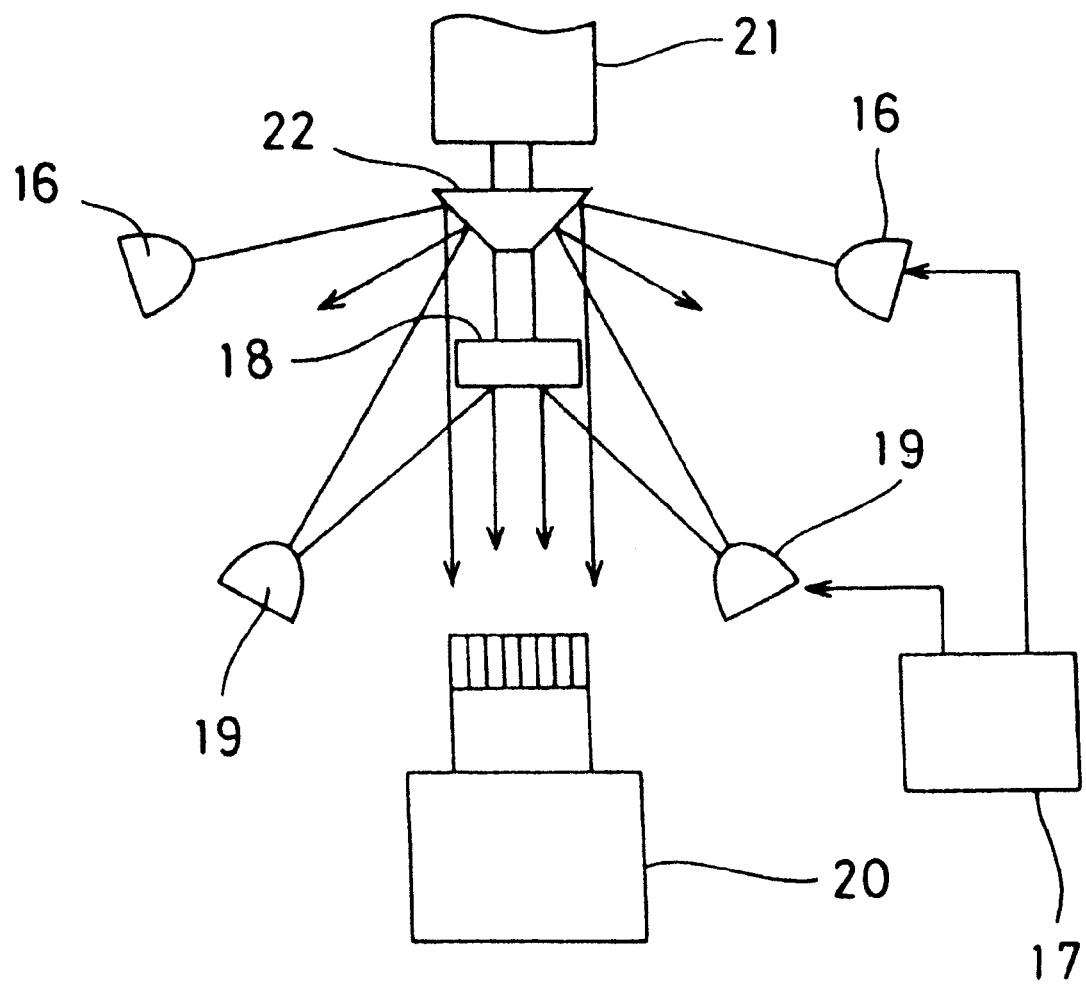
FIG. 3 is a schematic diagram illustrating the arrangement of a visual recognition apparatus according to a second embodiment of the invention.
Figure 4:
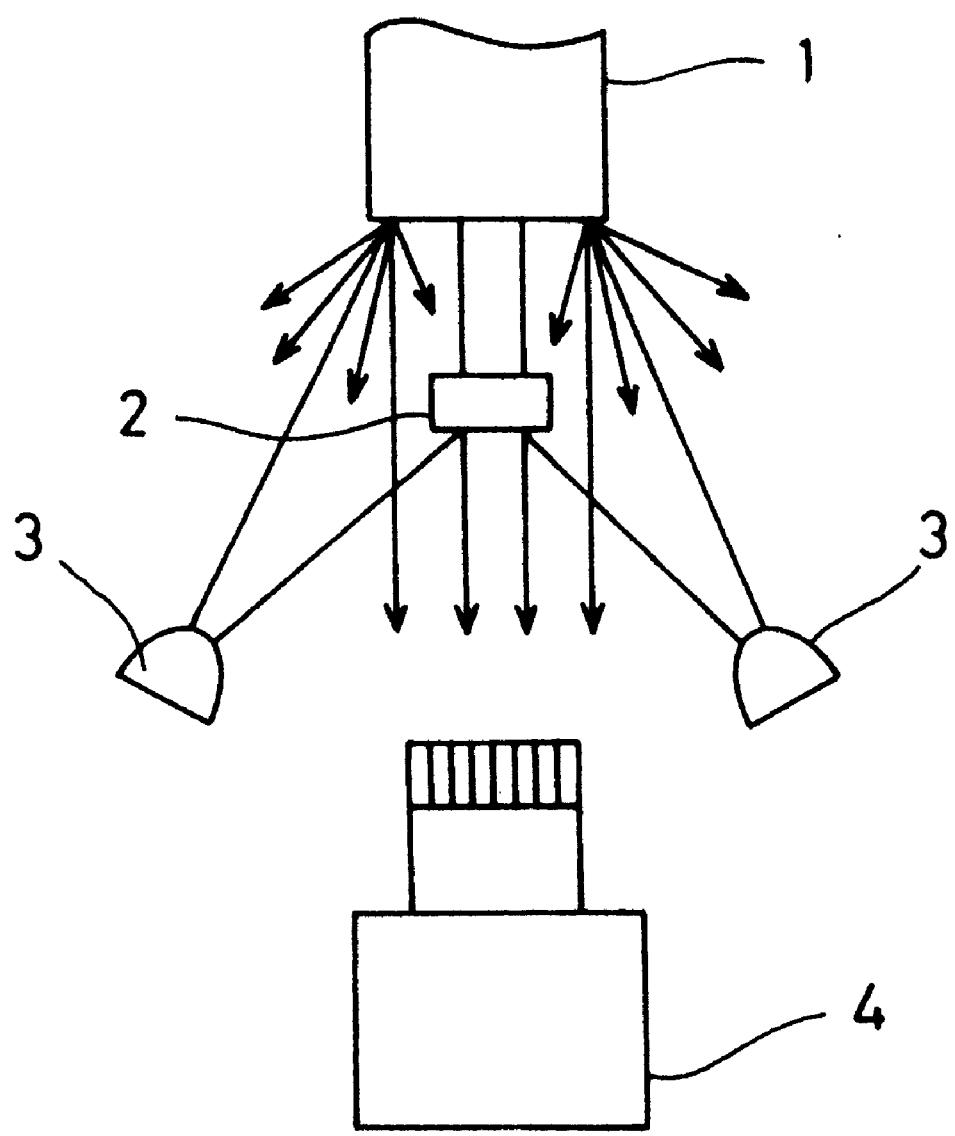
FIG. 4 is a schematic diagram illustrating the arrangement of a conventional visual recognition apparatus.

FIG. 3 schematically illustrates the arrangement of the visual recognition apparatus of this embodiment. As seen in the figure, this visual recognition apparatus is formed by adding a lighting element for transmitted illumination 16 and a control unit 17 to the arrangement of the visual recognition apparatus of the first embodiment shown in FIGS. 1 and 2. The lighting element for transmitted illumination 16 is located at such a position that a light emitted therefrom is reflected by a mirror-surfaced collar 22 to become incident on a camera 20.

Now referring to FIG. 3, description will be given on the operation of the visual recognition apparatus of the above arrangement.

In the figure, a subject of recognition 18 is retained and photographed in the same manner as in the visual recognition apparatus of the first embodiment shown in FIGS. 1 and 2, except for that the control unit 17 suitably selects to turn on either a lighting element for reflected illumination 19 or the lighting element for transmitted illumination 16 depending upon a type of the recognition subject 18.

In case where the control unit 17 turns on the lighting element for reflected illumination 19, the camera 20 picks up an image exclusive of a retainer 20 similarly to the first embodiment. In case where the control unit 17 turns on the lighting element for transmitted illumination 16, light rays emitted therefrom are reflected by the mirror-surfaced collar 22 to become incident on the camera 20. This produces a similar effect to that the subject of recognition 18 is backlit, which allows the camera 20 to pick up an image limited to the recognition subject 18 illuminated by the transmitted light rays.

In the visual recognition apparatus of this embodiment arranged as described above, the lighting element for transmitted illumination 16, the lighting element for reflected illumination 19, the camera 20 and the mirror-surfaced collar 22 are located at predetermined positions, respectively, so that the control unit 17 switches between the lighting element for reflected illumination 19 and the lighting element for transmitted illumination 16 for allowing the camera 20 to pick up an image fit for the image recognition processing for recognizing the subject 18.

It is to be noted that a mirror-surfaced collar incorporated in a retainer can produce a similar effect to that of the visual recognition apparatuses of the first and the second embodiments.

What is claimed is:

1. A visual recognition apparatus, which visually recognizes, as a subject of recognition, a component supplied to an industrial automated system, comprising:

a retainer for retaining the subject to be visually recognized, a lighting element for illuminating the subject of recognition held by said retainer, an imaging unit for capturing an image of the subject of recognition held by the retainer with light emanating from the lighting element illuminating the subject of recognition and entering the imaging unit, and a mirror-surfaced collar for reflecting the light from the lighting element toward the retainer and configured to reflect light illuminating the subject of recognition, in the direction of a light path to enter the imaging unit and to reflect light applied not to the subject of recognition, to deviate it from the light path to enter the imaging unit.

2. A visual recognition apparatus as claimed in claim 1, wherein the lighting element, the imaging unit and the mirror-surfaced collar have a positional relationship that the light from the lighting element toward the retainer is reflected for deviation from the light path to enter the imaging unit.

3. A visual recognition apparatus as claimed in claim 2, wherein the retainer, the mirror-surfaced collar, the subject of recognition, and the imaging unit are arranged in series, and the lighting element is arranged diagonally from the imaging unit.

4. A visual recognition apparatus as claimed in claim 3, wherein the mirror-surfaced collar is provided in the retainer.

5. A visual recognition apparatus, which visually recognizes, as a subject of recognition, a component supplied to an industrial automated system, comprising a retainer for retaining the subject to be visually recognized, a mirror-surfaced collar provided so as to cover said retainer, a lighting element for applying suitable light rays to the mirror-surfaced collar, and an imaging unit for capturing an image of the subject of recognition held by said retainer, said mirror-surfaced collar so configured as to reflect the light rays from the lighting element toward the retainer in a direction to enter the imaging unit.

6. A visual recognition apparatus, which visually recognizes, as a subject of recognition, a component supplied to an industrial automated system, comprising:
   a retainer for retaining the subject to be visually recognized,
   a mirror-surfaced collar provided so as to cover said retainer,
   a first lighting element located so that the mirror-surfaced collar reflects light coming toward the retainer, in a direction to deviate it from the light path to enter the imaging unit, and
   a second lighting element located so that the mirror-surfaced collar reflects light coming toward the retainer, in the direction of a light path to enter the imaging unit.

7. A component recognition method for recognizing a component, held by a retainer, by an imaging unit, comprising the steps of:
   a) applying light emanating from a first lighting element to both the component and a mirror-surfaced collar covering the retainer so that the mirror-surfaced collar reflects the light away from a light path so as not to enter the imaging unit, whereby the component is recognized,
   b) applying light emanating from a second lighting element to the mirror-surfaced collar so as to be reflected therefrom and become incident on the imaging unit for recognition of the component, and
   c) selecting one of steps b) and c) depending on the type of the component.

8. A visual recognition method as claimed in claim 7, wherein the first and second lighting elements are positioned separately for steps a) and b), respectively.

* * * * *